United States Patent
Pai et al.

(10) Patent No.: US 9,632,844 B2
(45) Date of Patent: *Apr. 25, 2017

(54) NON-PREEMPTION OF A GROUP OF INTERCHANGEABLE TASKS IN A COMPUTING DEVICE

(71) Applicant: International Business Machines Corporation, Armonk, NY (US)

(72) Inventors: Ramachandra N Pai, Beaverton, OR (US); Yun Wang, Shanghai (CN); Guang Rong Xiao, Shanghai (CN); Wei Yang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

This patent is subject to a terminal disclaimer.

(21) Appl. No.: 14/105,060

(22) Filed: Dec. 12, 2013

(65) Prior Publication Data

US 2015/0169364 A1   Jun. 18, 2015

(51) Int. Cl.
    *G06F 9/46*   (2006.01)
    *G06F 9/54*   (2006.01)
    *G06F 9/48*   (2006.01)

(52) U.S. Cl.
    CPC .............. *G06F 9/54* (2013.01); *G06F 9/4881* (2013.01)

(58) Field of Classification Search
    None
    See application file for complete search history.

(56) References Cited

U.S. PATENT DOCUMENTS

| | | | |
|---|---|---|---|
| 5,247,677 A * | 9/1993 | Welland | G06F 9/4881 718/103 |
| 6,430,594 B1 | 8/2002 | Akiyama et al. | |
| 6,757,897 B1 * | 6/2004 | Shi | G06F 9/4843 710/240 |
| 6,948,172 B1 * | 9/2005 | D'Souza | G06F 9/4881 718/106 |
| 6,952,825 B1 * | 10/2005 | Cockx | G06F 8/20 717/104 |
| 6,961,934 B2 | 11/2005 | Alford et al. | |

(Continued)

OTHER PUBLICATIONS

Andre Goforth, et al., Real-Time Design with Peer Tasks, NASA Technical Memorandum 110367, http://ia700603.us.archive.org/0/items/nasa_techdoc_19960002570/19960002570.pdf, Oct. 1995.

(Continued)

*Primary Examiner* — Hiren Patel
(74) *Attorney, Agent, or Firm* — Kunzler Law Group

(57) ABSTRACT

A non-preemption task group apparatus comprises a scheduling module that identifies a first task that is one of executing and scheduled to execute on a processor during a first time slice and a second task to be executed on a processor during a subsequent time slice, the first slice occurring before the subsequent slice, a relationship module that compares the first task to the second task, and an examining module that identifies whether the first task and the second task are interchangeable tasks based on the comparison, wherein the first task executes during the subsequent time slice in response to the first task and the second task being identified as interchangeable.

18 Claims, 7 Drawing Sheets

(56) References Cited

U.S. PATENT DOCUMENTS

| | | | | |
|---|---|---|---|---|
| 6,986,141 | B1* | 1/2006 | Diepstraten | G06F 9/4843 712/228 |
| 7,082,607 | B2 | 7/2006 | Lake et al. | |
| 7,657,890 | B2 | 2/2010 | Kanai et al. | |
| 7,721,286 | B2 | 5/2010 | D'Souza | |
| 7,735,087 | B2* | 6/2010 | Hayashi | G06F 9/4881 718/102 |
| 7,752,622 | B1* | 7/2010 | Markov | G06F 9/4881 718/102 |
| 8,893,135 | B2* | 11/2014 | Yukawa | H04N 21/4432 718/102 |
| 8,984,527 | B2* | 3/2015 | Backensto | G06F 9/4881 718/107 |
| 9,372,729 | B2* | 6/2016 | Fecioru | G06F 9/4887 |
| 2002/0138321 | A1* | 9/2002 | Yuan | G06Q 10/10 705/80 |
| 2004/0045003 | A1* | 3/2004 | Lake | G06F 9/4881 718/103 |
| 2004/0064817 | A1* | 4/2004 | Shibayama | G06F 9/5066 718/104 |
| 2004/0181791 | A1* | 9/2004 | Hayashi | G06F 9/4881 718/100 |
| 2006/0218558 | A1* | 9/2006 | Torii | G06F 9/4887 718/107 |
| 2007/0118838 | A1* | 5/2007 | Tsujino | G06F 9/4881 718/103 |
| 2009/0320029 | A1* | 12/2009 | Kottomtharayil | G06F 9/505 718/102 |
| 2010/0050184 | A1* | 2/2010 | Lin | G06F 9/30043 718/107 |
| 2010/0100886 | A1* | 4/2010 | Takagi | G06F 9/5027 718/104 |
| 2012/0017217 | A1* | 1/2012 | Umezawa | G06F 9/526 718/102 |
| 2012/0180068 | A1 | 7/2012 | Wein et al. | |
| 2013/0152093 | A1* | 6/2013 | Duncan | G06F 9/461 718/102 |
| 2013/0305260 | A1* | 11/2013 | Backensto | G06F 9/4887 718/108 |
| 2014/0026149 | A1* | 1/2014 | Backensto | G06F 9/4881 718/107 |
| 2014/0040904 | A1* | 2/2014 | Giusto | G06F 9/4881 718/103 |
| 2015/0135183 | A1* | 5/2015 | Kipp | G06F 9/46 718/103 |

OTHER PUBLICATIONS

Matthew C. Gombolay, et al., A Uniprocessor Scheduling Policy for Non-Preemptive Task Sets with Precedence and Temporal Constraints, https://interactive.mit.edu/sites/default/files/documents/infotechPaperGombolayShah.pdf, Jun. 6, 2013.

Rony Ghattas, et al., Preemption Threshold Scheduling: Stack Optimality, Enhancements and Analysis, www.cesr.ncsu.edu/agdean/Papers/ghattas-Preemption, 2007.

Wikipedia, Gang scheduling, http://en.wikipedia.org/w/index.php?title=Gang.scheduling&oldid=554852390, Last Modified May 2013.

Wikipedia, Grand Central Dispatch, http://en.wikipedia.org/wiki/Grand_Central_Dispatch, Jun. 2010.

Wikipedia, http://en.wikipedia.org/wiki/Thread, Last Modified Nov. 9, 2013.

* cited by examiner

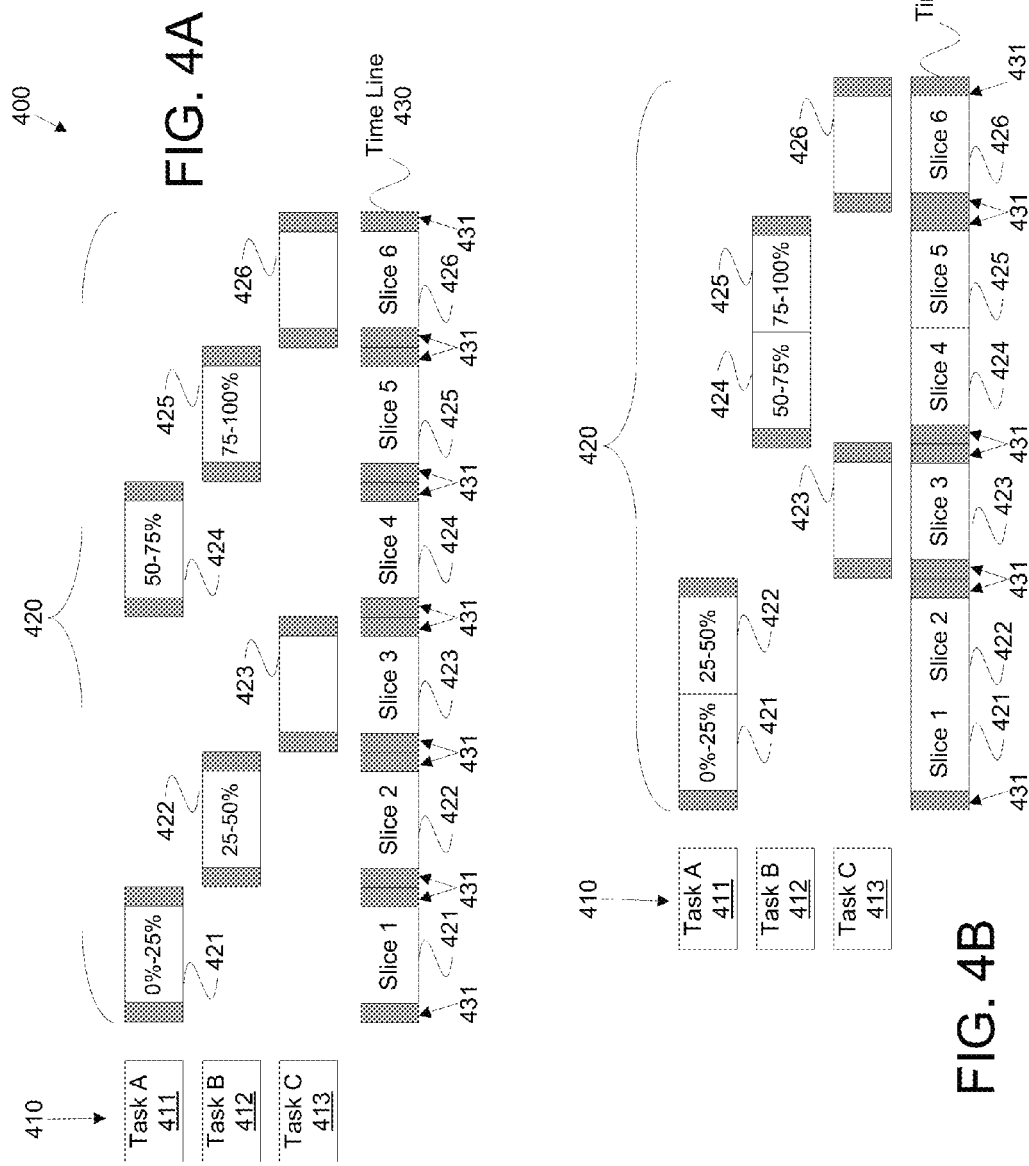

NON-PREEMPTION OF A GROUP OF INTERCHANGEABLE TASKS IN A COMPUTING DEVICE

FIELD

The subject matter disclosed herein relates to workload management in a computer system and more particularly relates to identifying non-preemption task groups.

BACKGROUND

Computer systems queue tasks for execution by a processor. Task preemption allows the processor to switch out a currently executing task for another task and is used to fairly allocate processor time to the queued tasks. Task preemption involves switching the context for the tasks and is computationally intensive. Context switching takes up processor time and increases overhead.

BRIEF SUMMARY

A method for non-preemption of interchangeable tasks is disclosed. An apparatus and computer program product also perform the functions of the method. The method for non-preemption of interchangeable tasks includes identifying a first task assigned to a first time slice, identifying a second task assigned to a subsequent time slice, comparing the first task to the second task, identifying whether the first task and the second task are interchangeable tasks, and executing the first task during the subsequent time slice in response to the first task and the second task being interchangeable. The first task may be currently executing on a processor or may be scheduled to execute on the processor. The method may include executing the second task during the subsequent time slice in response to identifying that the first task and the second task are not interchangeable tasks. The method may include identifying a processor load and comparing the first task to the second task when the processor load moderate or heavy.

The method may include comparing a first task group identifier of the first task to a second task group identifier of the second task, and identifying whether the first task and the second task are interchangeable based on the first task group identifier matching the second task group identifier. The method may also include identifying whether the first task and the second task belong to a common group of interchangeable tasks.

The method may include identifying at least two interchangeable tasks scheduled for execution on the processor and assigning consecutive time slices to the at least two interchangeable tasks. The method may include identifying at least two interchangeable tasks scheduled to execute on the processor and associating an indicator with the tasks designating that the tasks are a part of a common group of interchangeable tasks. The first task and the second task may be identified as being interchangeable tasks when both the first task and the second task are a part of the group of interchangeable tasks.

The method may include allocating time slices equally to tasks scheduled to execute on the processor, the scheduled tasks including the first task and the second task. The method may include receiving an interrupt signal at the end of the first time slice and identifying whether the first task and the second task are interchangeable tasks upon receiving the interrupt signal. The method may include suppressing delivery of an interrupt signal during the consecutive times slices allocated to the at least two interchangeable tasks.

The processor may be a central processing unit having a plurality of processing cores, and wherein the first task and the second task are assigned to a common processing core of the plurality of processing cores.

The apparatus for non-preemption of interchangeable tasks includes a scheduling module that identifies a first task that is one of executing and scheduled to execute on a processor during a first time slice and a second task to be executed on a processor during a subsequent time slice, the first time slice occurring before the subsequent time slice, a relationship module that compares the first task to the second task; and an examining module that identifies whether the first task and the second task are interchangeable tasks based on the comparison. If the first task and the second task are identified as interchangeable, the first task may executes during the subsequent time slice. Otherwise, the second task may execute during the subsequent time slice.

The apparatus may compare a first task group identifier of the first task to a second task group identifier of the second task and determine whether the first task group identifier matches the second task group identifier. The apparatus may identify whether the first task and the second task belong to a common group of interchangeable tasks.

The apparatus may include a task grouping module that identifies at least two interchangeable tasks scheduled to execute on the processor and associates an indicator with the at least two interchangeable tasks, the indicator designating that the at least two tasks are a part of a common group of interchangeable tasks. The apparatus may evaluate the indicator to determine whether both the first task and the second task are a part of the group of interchangeable tasks. The apparatus may include a task queuing module that assigns the at least two interchangeable tasks to adjacent time slices.

The apparatus may include a load assessing module that identifies a processor load. The apparatus may compare the first task to the second task when the processor load is moderate or heavy.

The computer program product for non-preemption of interchangeable tasks includes computer readable program code embedded on a computer readable storage medium, the program code configured to identify a first task assigned to a first time slice, identify a second task assigned to a subsequent time slice, compare the first task to the second task, identify whether the first task and the second task are interchangeable tasks, and execute the first task during the subsequent time slice in response to the first task and the second task being interchangeable.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4A is a diagram illustrating one example of using a system for non-preemption of interchangeable tasks in accordance with an embodiment of the present invention;

FIG. 4B is a diagram illustrating a second example of using a system for non-preemption of interchangeable tasks in accordance with an embodiment of the present invention;

DETAILED DESCRIPTION OF THE INVENTION

Figure 1:
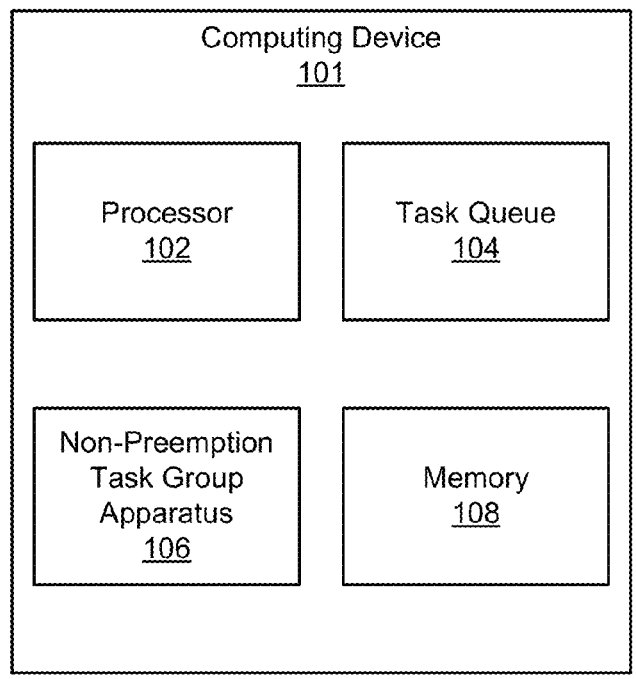
FIG. 1 is a schematic block diagram illustrating one embodiment of a system for non-preemption of interchangeable tasks in accordance with an embodiment of the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

FIG. 1 is a schematic block diagram illustrating one embodiment of a system 100 for non-preemption of interchangeable tasks in accordance with an embodiment of the present invention. The system 100 includes a computing device 101 that includes a processor 102, a task queue 104, a non-preemption task group apparatus 106, and a memory 108, which are described below.

The processor 102 may include any known controller capable of executing computer-readable instructions and/or capable of performing logical operations on the biometric data. The processor 102 may include one or more central processing units, one or more general-purpose processors, one or more application-specific processors, one or more virtual processors (e.g., the computing device 101 may be a virtual machine operating within a host), one or more processor cores, or the like. For example, the processor 102 may be a microcontroller, a microprocessor, a graphics processing unit ("GPU"), a field programmable gate array ("FPGA"), or similar programmable controller. In some embodiments, the processor 102 executes instructions stored in the memory 108 to perform the methods and routines described herein.

The task queue 104, in one embodiment, holds a plurality of tasks awaiting execution on the processor 102. As used herein, a task is a unit of executable code within a computer program and may be synonymous with "thread" or "process" depending on the operating system. In some embodiments, the task queue 104 contains executable code and/or context information for each task awaiting execution. In some embodiments, the task queue contains pointers that reference to executable code and/or context information for each task awaiting execution. In one embodiment, the task queue 104 is specific to the processor 102. Where there is more than one processor 102 in the system 100, there may be more than one task queue 104 as well.

The non-preemption task group apparatus 106, in one embodiment, organizes interchangeable tasks into non-preemption task groups and suppresses preemption as between tasks of a non-preemption task group. The non-preemption task group apparatus 106 is described in more detail with regards to FIGS. 2 and 3, below.

The memory 108 is a computer readable storage medium and is accessible by the processor 102 and the non-preemption task group apparatus 106. The memory 108 includes stored programs, application, data, and the like. In one embodiment, the memory 108 includes context information for pending tasks. In another embodiment, the memory 108 contains executable code of the pending tasks.

Figure 2:
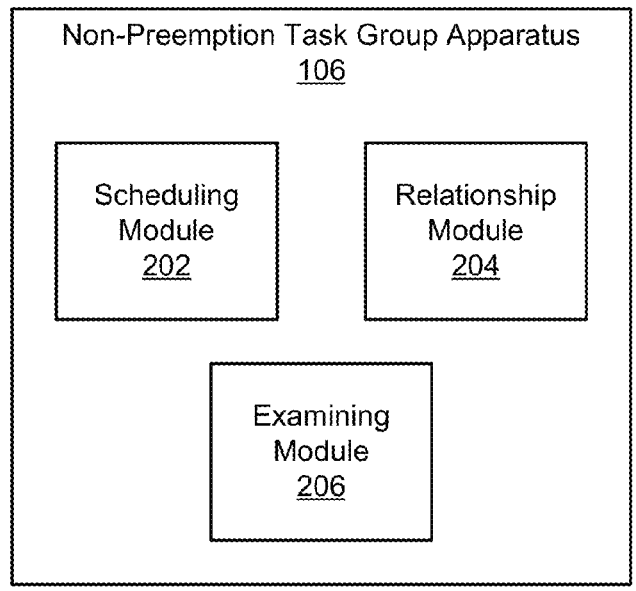
FIG. 2 is a schematic block diagram illustrating one embodiment of an apparatus for non-preemption of interchangeable tasks in accordance with an embodiment of the present invention.

FIG. 2 is a schematic block diagram illustrating one embodiment of an apparatus 200 for non-preemption of interchangeable tasks in accordance with an embodiment of the present invention. The apparatus 200 includes one embodiment of a non-preemption task group apparatus 106 with a scheduling module 202, a relationship module 204, and an examining module 206, which are described below.

The apparatus 200, in one embodiment, includes a scheduling module 202 that identifies a first task and a second task. In some embodiments, the first task and the second task are tasks assigned to adjacent time slices of processor time. In some embodiments, the first task is currently executing on the processor 102 during a first time slice. In some embodiments, the first task is scheduled to execute on the processor 102 during the first time slice. The second task is to be executed on the processor 102 during a subsequent, second time slice.

In some embodiments, the scheduling module 202 schedules tasks to time slices of processor time. For example, the scheduling module 202 may identify tasks in the task queue 104 and assign time slices to the identified tasks. In certain embodiments, the scheduling module 202 is able to schedule certain tasks to adjacent time slices. For example, the scheduling module 202 may assign interchangeable tasks to adjacent time slices.

The apparatus 200, in one embodiment, includes a relationship module 204 that compares the first task to the second task. In some embodiments, the relationship module 204 compares group identifiers of the first and second tasks. For example, each task may include a group identifier and the relationship module 204 may determine if the group identifier of a first task matches the group identifier of a second task. In some embodiments, the relationship module 204 compares context information associated with the first and second tasks. Context information is the set of data used by a task and may vary according to the processor 102 and/or operating system being used. In some embodiments, the context information is data necessary to allow a task to be preempted (interrupted) and resumed. In some embodiments, the context information includes data in registers that the task may be using and any other operating system specific data that may be necessary. In some embodiments, context information may be stored in a process control block data structure or in a task controlling block data structure. In certain embodiments, the relationship module 204 outputs data relating to the comparison to other devices or modules, such as the examining module 206.

In some embodiments, the relationship module 204 may forgo comparing the first and second tasks when the processing load is light. For example, where few tasks are in the task queue 104, the comparison may be forgone as efficiency gains may be negligible.

In one embodiment, the apparatus 200 includes an examining module 206 that identifies whether the first task and the second task are interchangeable tasks based on a comparison performed by the relationship module 204. In one embodiment, the examining module 206 may identify whether the first task and the second task belong to a common group of interchangeable tasks. For example, where the first task and the second task share a common task group indicator, the tasks may be identified as interchangeable. As another example, where the first task and the second task share the same context information, the tasks may be identified as interchangeable tasks. In some embodiments, the results of the comparison are used to determine if further examination of the tasks is warranted. For example, where the relationship module 204 indicates that the first task and the second task are invoked by the same program, the examining module 206 may examine context information and other indicators to determine if the tasks are interchangeable.

Where the first task and the second task are interchangeable tasks, the non-preemption task group apparatus 106, in one embodiment, may cause the processor 102 to execute the first task during the second time slice. In some embodiments, the non-preemption task group apparatus 106 also prevents a context switch from occurring between the first time slice and the second time slice. When a context switch (e.g., task preemption) is prevented, context and/or state information for the first task remains in registers and/or cache of the processor 102 while the first task executes on the second time slice. As context switching is resource intensive and requires a certain amount of time to, for example, saving and loading registers and memory maps, updating various tables and lists, and the like. Therefore, the non-preemption task group apparatus 106 saves time and increases system efficiency by preventing a context switch when the first task and the second task are interchangeable tasks.

However, in instances where the first task and the second task are not interchangeable tasks, the non-preemption task group apparatus 106 may not intercede so that the first task is switched out at the end of the first time slice and the second task is switched in for the second time slice. Accordingly, context and/or state information in registers and/or cache of the processor 102 for the first task is stored in memory 108 and replaced with context and/or state information for the second task.

In some embodiments, the non-preemption task group apparatus 106 operates in response to receiving an interrupt signal. For example, where the first task is a currently executing task, the non-preemption task group apparatus 106 may identify whether the second task is interchangeable upon receiving an interrupt signal at the end of the first time slice. In some embodiments, the non-preemption task group apparatus 106 suppresses delivery of a task interrupt signal when the first task and the second task are identified as being interchangeable. For example, where the first task is not yet executing, the non-preemption task group apparatus 106 may identify that the first task and the second task are interchangeable and prevent a task interrupt signal from being received. As another example, non-preemption task group apparatus 106 may receive and suppress the task interrupt signal and spoof the computing device 101 into acting as if the second task has already been switched in.

Figure 3:
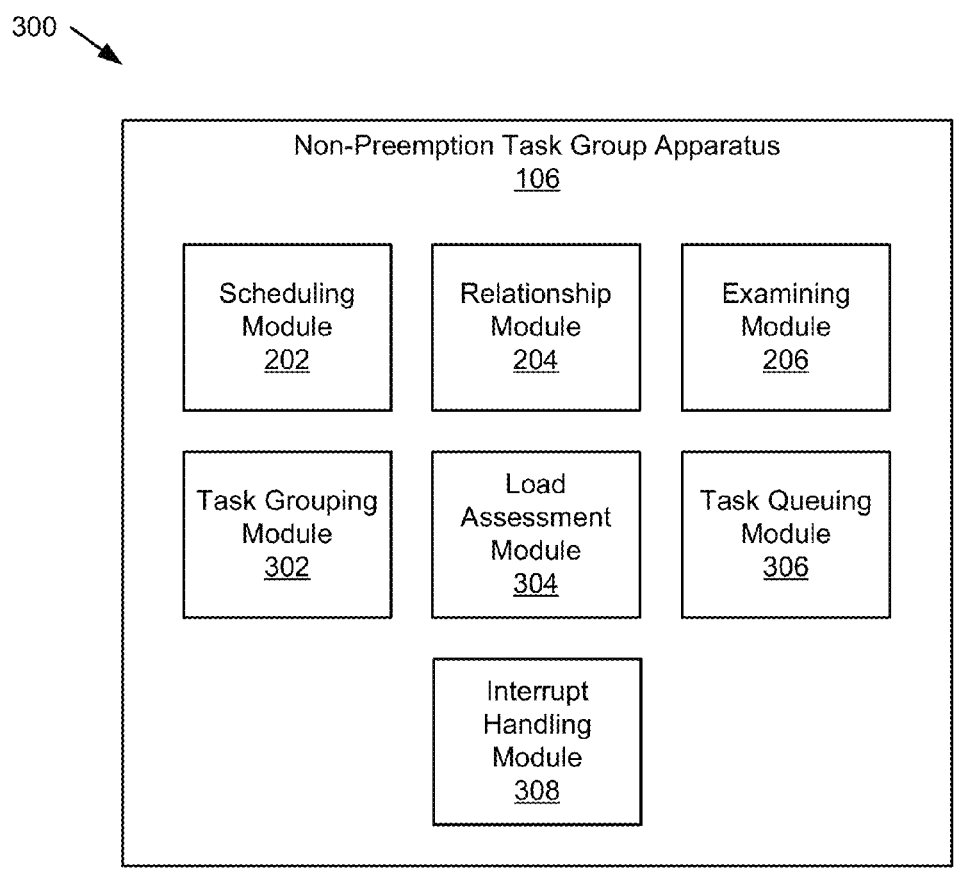
FIG. 3 is a schematic block diagram illustrating another embodiment of an apparatus for non-preemption of interchangeable tasks in accordance with an embodiment of the present invention.

FIG. 3 is a schematic block diagram illustrating one embodiment of an apparatus 300 for non-preemption of interchangeable tasks in accordance with an embodiment of the present invention. The apparatus 300 includes one embodiment of a non-preemption task group apparatus 106 with a scheduling module 202, a relationship module 204, and an examining module 206, which may be substantially similar to those discussed above with reference to the apparatus 200 of FIG. 2. The apparatus 300 may also include a task grouping module 302, a load assessment module 304, a task queuing module 306, and/or an interrupt handling module 308, which are described below.

The apparatus 300, in one embodiment, includes a task grouping module 302 that identifies at least two interchangeable tasks scheduled to execute on the processor 102. These interchangeable tasks are each given an indicator designating that the at least two tasks are a part of a common group of interchangeable tasks. When determining whether the first task and the second task are interchangeable, the non-preemption task group apparatus 106 may examine the indicator.

In some embodiments, the indicator may be stored with context information for the interchangeable tasks. In some embodiments, the indicator is stored in a table, bitmap, or other data structure. The indicator may be checked by referencing an identifier associated with the task.

In one embodiment, the apparatus 300 includes a load assessment module 304 that identifies loading state of the processor 102. The loading state of the processor 102 may determine whether the first and second tasks are evaluated for being interchangeable. In some embodiments, the relationship module 204 compares the first task to the second task in response to the processor load being identified as moderate or heavy in order to improve system performance.

In another embodiment, the apparatus 300 includes a task queuing module 306 that schedules interchangeable tasks to adjacent or consecutive time slices. The task queuing module 306 may identify interchangeable tasks itself, or may work with another module, such as the relationship module 204 and/or the examining module 206, to identify interchangeable tasks. In some embodiments, the task queuing module 306 identifies interchangeable tasks as tasks are added to the task queue 104. In some embodiments, the task queuing module 306 allocates adjacent time slices to the interchangeable tasks. In some embodiments, the task queuing module 306 arranges tasks in the task queue 104 so that interchangeable tasks are assigned to consecutive time slices by another module or mechanism. One of skill in the art will recognize other ways that the task queuing module 306 may schedule interchangeable tasks to adjacent or consecutive time slices.

The interrupt handling module 308 receives and handles a task interrupt signal. The task interrupt signal may be received at the end of a time slice and, in one embodiment, triggers switching out the current task. In certain embodiments, the task interrupt signal is received at the end of each time slice and triggers a preemption of one task for another. In some embodiments, the interrupt handling module 308 triggers identifying whether the first task and the second task are interchangeable in response to receiving the task interrupt signal. In some embodiments, the interrupt handling module 308 triggers one of the scheduling module 202, the relationship module 204 to compare the first and second tasks.

In one embodiment, the interrupt handling module 308 suppresses delivery of the interrupt signal. For example, where consecutive times slices are allocated to at least two interchangeable tasks, the interrupt handling module 308 may suppress delivery of the task interrupt signal until the end of the consecutive time slices. In another embodiment, the interrupt handling module 308 may spoof the computing device 101 into acting as if preemption between the interchangeable tasks has already occurred.

FIGS. 4A and 4B are diagrams illustrating one example of using a system 400 for non-preemption of interchangeable tasks in accordance with an embodiment of the present invention. The system 400 includes a plurality of tasks 410 and a plurality of time slices 420. The plurality of tasks includes task A 411, task B 412, and task C 413. Although only three tasks are shown for simplicity, the system 400 may include more than three tasks 410. The plurality of time slices 420 includes a first time slice 421, a second time slice 422, a third time slice 423, a fourth time slice 424, a fifth time slice 425, and a sixth time slice 426. Although only six time slice are shown for simplicity, the system 400 may include more than six time slices 420.

In the embodiment of FIG. 4A, task A 411 and task B 412 are interchangeable tasks working towards a common goal, but task C 413 is not interchangeable with either task A 411 or task B 412. The first time slice 421 and fourth time slice 424 are assigned to task A 411; the second time slice 422 and the fifth time slice 425 are assigned to task B 412; and the third time slice 423 and the sixth time slice 426 are assigned to task C 413. Execution of the tasks results in time line 430. Time line 430 includes several overhead time frames 431 that represent the overhead time required to switch out one task (e.g., task A 411) and to switch in another task (e.g., task B 412).

In the embodiment of FIG. 4A, task A 411 and task B 412 are able to accomplish 25% of the goal during each time slice 420. Thus after the second time slice 422 the goal is 50% complete, and after the fifth time slice 425 the goal is 100% completed. In the embodiment of FIG. 4A, task non-preemption is not utilized (e.g., due to system load, etc.) and the interchangeable tasks are preempted in favor of another. The computation time to accomplish the goal is equal to the four time slices plus six overhead time values.

In FIG. 4B task non-preemption is utilized between the interchangeable task A 411 and task B 412 resulting in decreased computation time to accomplish the goal, as evidenced by time line 435. In FIG. 4B, task A 411 is non-preempted, that is, it is not switched out in favor of task B 412 at the end of the first time slice 421. Instead, task A 411 executed during the second time slice 422. Task A 411 is preempted in favor of task C 413 at the end of the second time slice 422 and task C is preempted in favor of task B at the end of the third time slice 423. Here, task B 412 is assigned to the fourth time slice 424. Again, non-preemption occurs between interchangeable tasks and task B 412 is not switched out at the end of the fourth time slice 424.

In the embodiment of FIG. 4B, where task non-preemption is employed, the computation time to accomplish the goal is equal to the four time slices plus two overhead time values. Thus system efficiency is improved by employing non-preemption between interchangeable tasks.

Figure 4C:
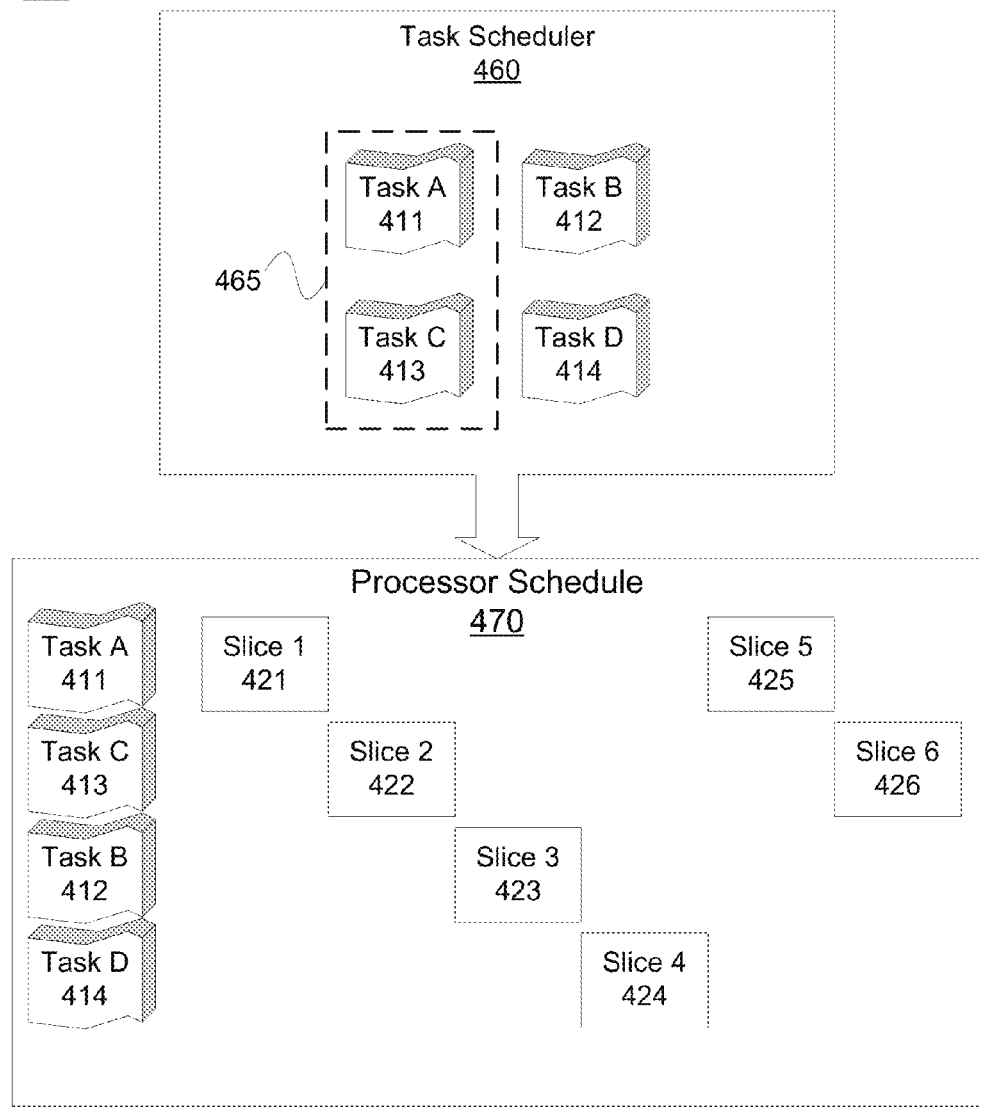
FIG. 4C is a diagram illustrating a third example of using a system for non-preemption of interchangeable tasks in accordance with an embodiment of the present invention.

FIG. 4C is a diagram illustrating one example of using a system 450 for task non-preemption in accordance with the present invention. The system 450 includes a task scheduler 460, a plurality of tasks (411-414), and a plurality of time slices (421-426). In some embodiments, the task scheduler 460 is a scheduling module such as the scheduling module 202 described above with reference to FIG. 2. In some embodiments, the task scheduler 460 is a task queuing module such as the task queuing module 306 described above with reference to FIG. 3.

The tasks scheduler 460 identifies a non-preemption task group 465 consisting of interchangeable task A 411 and task C 413. In the embodiment of FIG. 4C, task B 412 and task D 414 are not interchangeable with any other task. After identifying the non-preemption task group 465, the task scheduler 460 assigns a processing order where task C 413 executes after task A 411 as shown in the processor schedule 470. Assigning interchangeable tasks to adjacent positions in the processing order maximizes non-preemption opportunities and increases system performance. In some embodiments, the task scheduler 460 assigns adjacent time slices 421, 422, 425 and 426 to member of the non-preemption task group 465. As illustrated, third time slice 423 is assigned to task B 412 and fourth time slice 424 is assigned to task D 414. Although not shown, in certain embodiments the task scheduler 460 schedules consecutive time slices to one task of the non-preemption task group 465. For example, the task scheduler 460 may assign time slices 421 and 422 to task A 411 and time slices 425 and 426 to task C 413.

Figure 5:
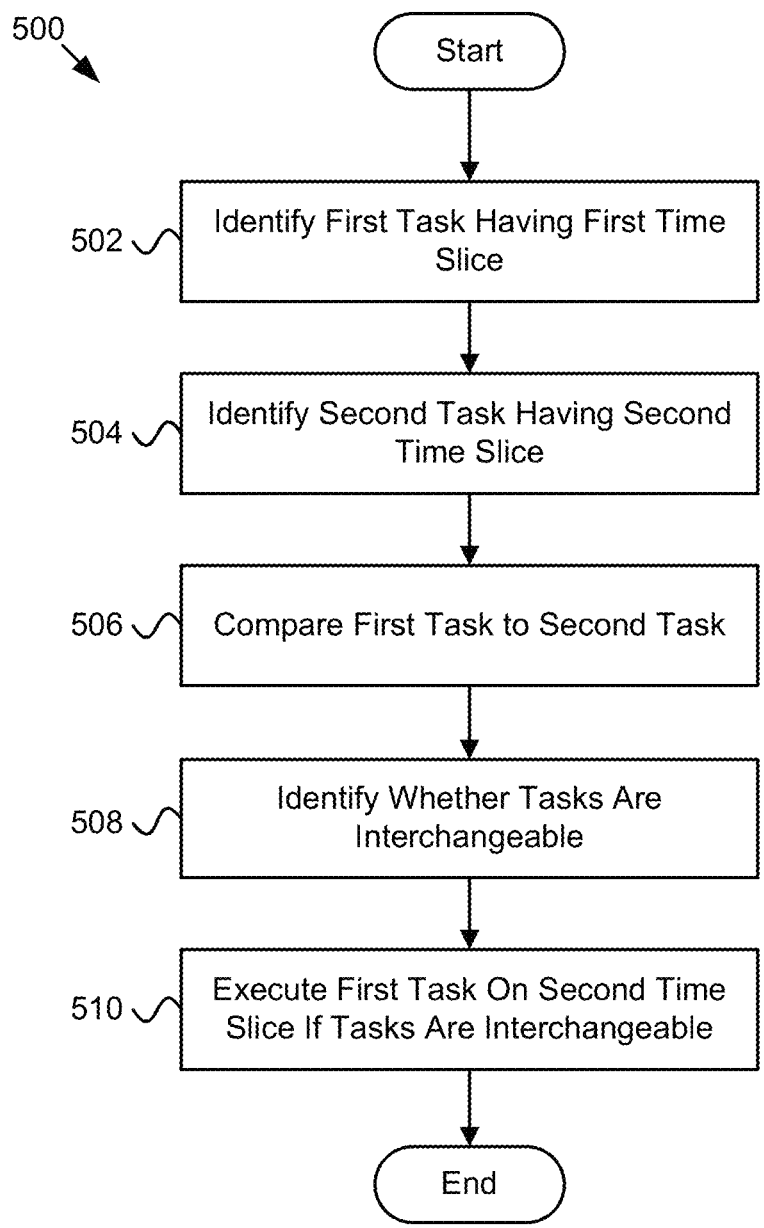
FIG. 5 is a schematic flow chart diagram illustrating one embodiment of a method for non-preemption of interchangeable tasks in accordance with an embodiment of the present invention.

FIG. 5 is a schematic flow chart diagram illustrating one embodiment of a method 500 for non-preemption of interchangeable tasks in accordance with the present invention. The method 500 begins and identifies 502 a first task assigned to a first time slice. The method 500 identifies 504 a second task assigned to a second time slice, the second time slice being subsequent to the first time slice. The method 500 compares 506 the first task to the second task. In some embodiments, the method 500 compares 506 group identifiers of the first and second tasks. In other embodiments, the method 500 compares 506 context information associated with the first and second tasks. In some embodiments, the method 500 compares 506 a first program invoking the first task and a second program invoking the second task.

The method 500 then identifies 508 whether the first task and the second task are interchangeable tasks. Interchangeable tasks share context information and work towards a common goal. If two interchangeable tasks are scheduled the subsequent interchangeable task will pick up where the earlier task left off.

The method 500 continues by executing 510 the first task on the second time slice when the first task and the second task are interchangeable tasks, and the method 500 ends. In some embodiments, non-preemption is performed to prevent a context switch at the end of the first time slice thereby reducing overhead time.

Figure 6:
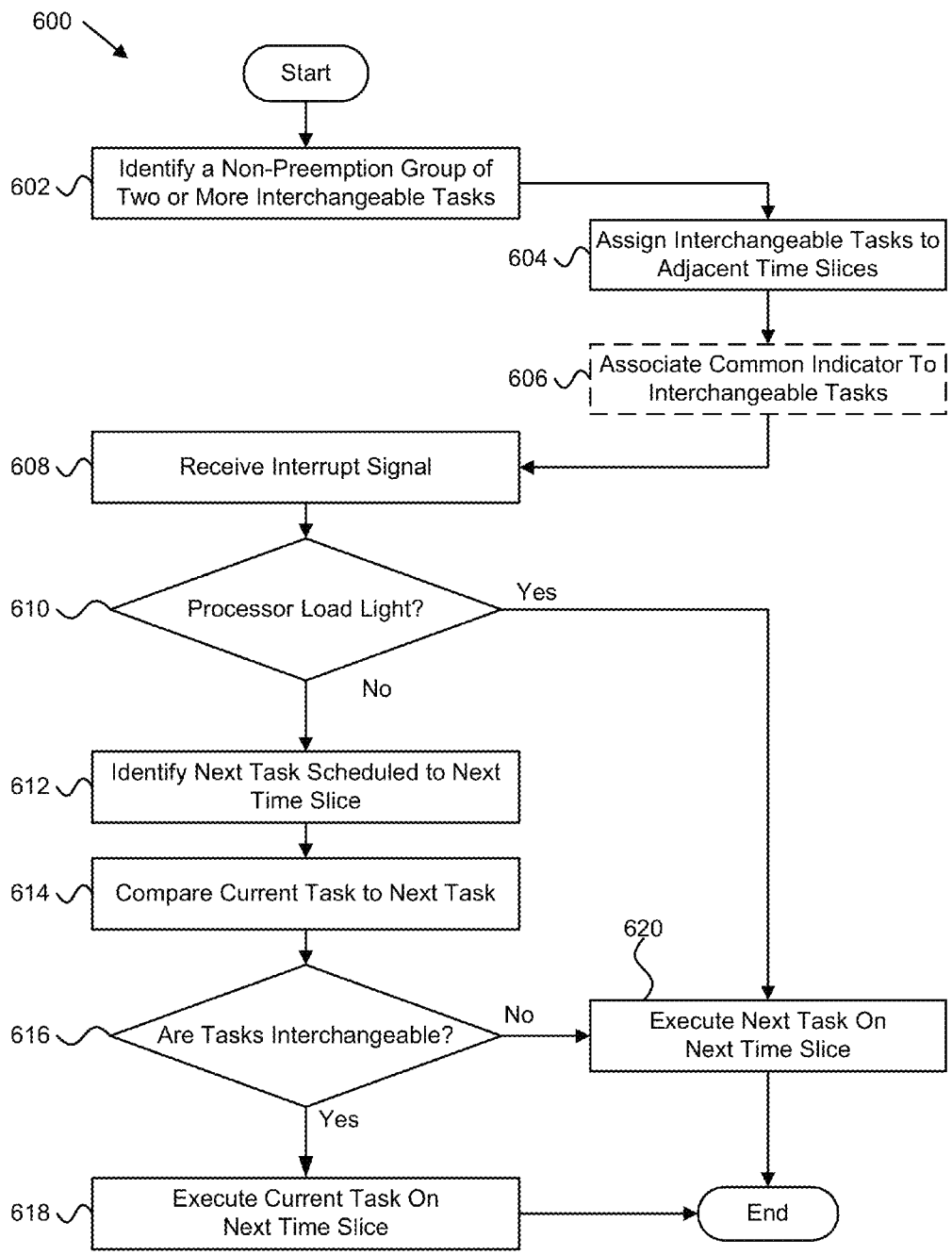
FIG. 6 is a schematic flow chart diagram illustrating a second embodiment of a method for non-preemption of interchangeable tasks in accordance with an embodiment of the present invention.

FIG. 6 is a schematic flow chart diagram illustrating one embodiment of a method 600 for non-preemption of interchangeable tasks in accordance with the present invention. The method 600 begins and identifies 602 a non-preemption group of two or more interchangeable tasks. The method 600 assigns 604 interchangeable tasks to adjacent slices of processor time. In some embodiments, the method 600 associates 606 the interchangeable tasks with a common indicator that identifies them as being interchangeable with one another. In certain embodiments, the common indicator is a group identifier associated with the non-preemption group.

The method 600 receives 608 an interrupt signal. The inter interrupt signal may be received at the end of a time slice. In certain embodiments, the interrupt signal is received at the end of each time slice. The interrupt signal triggers task preemption, i.e., switching out a currently executing task for another even if the currently running task is not complete. The method 600 determines 610 whether the processor load is light responsive to receiving the interrupt signal. If the method 600 determines 610 that the processor load is light, the method 600 executes 620 the next task on the next time slice. If the method 600 determines 610 that the processor load is not light, the method 600 identifies 612 a next task scheduled to run on the next time slice.

The method 600 compares 614 a current task to the next task to identify whether they are interchangeable tasks. In some embodiments, the comparison determines whether the tasks belong to the non-preemption group. In some embodiments, group identifiers, context information, and/or invoking programs are compared. The method 600 determines 616 if the tasks are interchangeable. If the method 600 determines 616 that the tasks are interchangeable, the non-preemption is invoked and the method 600 executes 618 the current task during the next time slice without switching context information. However, if the method 600 determines 616 that the tasks are not interchangeable, then the task preemption occurs and the method 600 executes 620 the next task during the next time slice after switching out the current task, and the method 600 ends.

Figure 7:
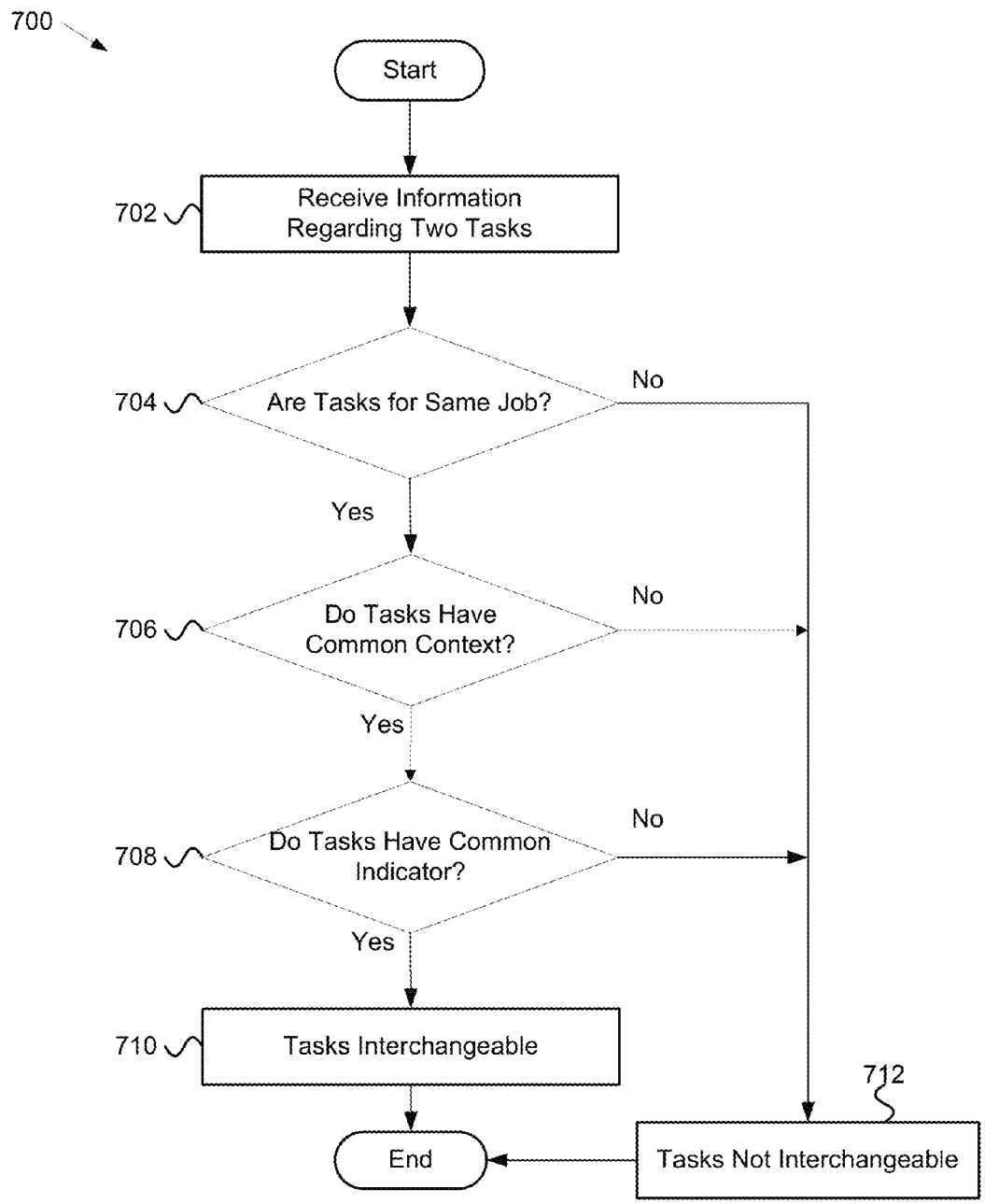
FIG. 7 is a schematic flow chart diagram illustrating one embodiment of a method for identifying interchangeable tasks in accordance with an embodiment of the present invention.

FIG. 7 is a schematic flow chart diagram illustrating one embodiment of a method 700 for identifying interchangeable tasks in accordance with the present invention. The method 700 begins and receives 702 information regarding two tasks. The information is examined to determine 704 whether the tasks are for the same job or program. If the method 700 determines 704 that the tasks are for the same job or program, the method 700 examines the information to determine 706 whether the tasks share common a context. If the method 700 determines 706 that the tasks share a common context, the method 700 examines the information to determine 708 whether the tasks have a common indicator. In some embodiments, interchangeable tasks are indicated as such by a pointer, a group identifier, or by another indicator. If the method 700 determines 708 that the tasks have a common indicator, the method 700 identifies 710 the tasks as being interchangeable, and the method 700 ends. If any of the determinations 704, 706, 708 are negative, the method 700 identifies 712 the tasks as not being interchangeable, and the method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a scheduling module that identifies a first task that is one of executing and scheduled to execute on a processor during a first time slice and a second task scheduled to be executed on the processor during a subsequent time slice immediately adjacent to the first time slice, the first time slice occurring before the subsequent time slice;

a relationship module that compares the first task to the second task;

an examining module that identifies whether the first task and the second task are interchangeable tasks based on the comparison, wherein interchangeable tasks share context information and belong to a common job;

a task queuing module that assigns the first task and the second task to adjacent time slices in response to the first task and the second task being identified as interchangeable tasks; and an interrupt handling module that suppresses delivery of an interrupt signal at the end of the first time slice in response to the first task and the second task being identified as interchangeable tasks, wherein the first task executes during the subsequent time slice in response to the first task and the second task being identified as interchangeable tasks, wherein at least a portion of the scheduling module, the relationship module, the examining module, the task queuing module, and the interrupt handling module comprise one or more of a hardware circuit and program instructions stored on one or more non-transitory computer readable media.

2. The apparatus of claim 1, wherein the second task executes during the subsequent time slice in response to identifying that the first task and the second task are not interchangeable tasks.

3. The apparatus of claim 1, wherein the relationship module compares a first task group identifier of the first task to a second task group identifier of the second task, and wherein the examining module determines whether the first task group identifier matches the second task group identifier.

4. The apparatus of claim 1, wherein the examining module identifies whether the first task and the second task belong to a common group of interchangeable tasks.

5. The apparatus of claim 1, further comprising:
a task grouping module that identifies at least two interchangeable tasks scheduled to execute on the processor and associates an indicator with the at least two interchangeable tasks, the indicator designating that the at least two tasks are part of a common group of interchangeable tasks,
wherein the examining module evaluates the indicator to determine whether the first task and the second task are part of the group of interchangeable tasks.

6. The apparatus of claim 1, further comprising a load assessing module that identifies a processor load, wherein the relationship module compares the first task to the second task in response to the processor load being identified as one of moderate and heavy.

7. The apparatus of claim 1, wherein during a time when the first task is executing on the processor, further comprising:
receiving an interrupt signal at an end of the first time slice; and
identifying whether the first task and the second task are interchangeable in response to receiving the interrupt signal.

8. The apparatus of claim 1, further comprising:
identifying a plurality of interchangeable tasks scheduled for execution on the processor; and
assigning consecutive time slices to the plurality of interchangeable tasks.

9. The apparatus of claim 1, wherein the processor is a central processing unit having a plurality of processing cores, and wherein the first task and the second task are assigned to a common processing core of the plurality of processing cores.

10. The apparatus of claim 1, further comprising allocating time slices equally to tasks scheduled to execute on the processor, the tasks scheduled including the first task and the second task.

11. The apparatus of claim 1, further configured to:
identify a second time slice allocated to the first task; and
execute the second task during the second time slice.

12. A computer program product comprising:
at least one non-transitory computer readable storage medium having computer readable program code embodied therewith, the computer readable program code, when read by a processor, configured to:
identify a first task that is one of executing and scheduled to execute on a processor during a first time slice;
identify a second task scheduled to be executed on the processor during a subsequent time slice immediately adjacent to the first time slice, the first time slice occurring before the subsequent time slice;
compare the first task to the second task;
identify whether the first task and the second task are interchangeable tasks based on the comparison, wherein interchangeable tasks share context information and belong to a common job;
assign the first task and the second task to adjacent time slices in response to the first task and the second task being identified as interchangeable tasks; and
an interrupt handling module that suppresses delivery of an interrupt signal at the end of the first time slice in response to the first task and the second task being identified as interchangeable tasks,
execute the first task during the subsequent time slice in response to the first task and the second task being identified as interchangeable tasks.

13. The computer program product of claim 12, further comprising executing the second task during the subsequent time slice in response to identifying that the first task and the second task are not interchangeable tasks.

14. The computer program product of claim 12, wherein comparing the first task to the second task comprises comparing a first task group identifier of the first task to a second task group identifier of the second task, and wherein identifying whether the first task and the second task are interchangeable comprises determining whether the first task group identifier matches the second task group identifier.

15. The computer program product of claim 12, further comprising:
identifying at least two interchangeable tasks scheduled to execute on the processor; and
associating an indicator with the at least two interchangeable tasks, the indicator designating that the at least two tasks are part of a common group of interchangeable tasks,
wherein identifying whether the first task and the second task are interchangeable tasks comprises evaluating the indicator to determine whether the first task and the second task are part of the group of interchangeable tasks.

16. The computer program product of claim 12, wherein during a time when the first task is executing on the processor, further comprising:

receiving an interrupt signal at an end of the first time slice; and identifying whether the first task and the second task are interchangeable in response to receiving the interrupt signal.

17. The computer program product of claim 12, further comprising:

identifying a plurality of interchangeable tasks scheduled for execution on the processor; and assigning consecutive time slices to the plurality of interchangeable tasks.

18. The computer program product of claim 12, the computer readable program code, when read by a processor, further configured to:

identify a second time slice allocated to the first task; and
execute the second task during the second time slice.

* * * * *